United States Patent [19]

Stopp et al.

[11] Patent Number: 4,946,653
[45] Date of Patent: Aug. 7, 1990

[54] PROCESS FOR THE SIMULTANEOUS CLASSIFICATION AND REGULATED, CONTINUOUS DISCHARGE OF PARTICULATE MATERIAL FROM FLUIDIZED BED REACTORS

[75] Inventors: Gerhard Stopp; Karl-Heinz Kreutzer, both of Leverkusen; Horst Karkossa, Leichlingen; Karl Mannes, Leverkusen; Hans-Joachim Laakmann, Leichlingen; Viktor Trescher, Leverkusen, all of Fed. Rep. of Germany

[73] Assignee: Bayer Aktiengesellschaft, Leverkusen, Fed. Rep. of Germany

[21] Appl. No.: 462,738

[22] Filed: Feb. 1, 1983

[30] Foreign Application Priority Data

Feb. 20, 1982 [DE] Fed. Rep. of Germany ....... 3206236

[51] Int. Cl.$^5$ .............................. B01J 2/02; B01J 8/26
[52] U.S. Cl. .................... 422/140; 23/313 FB; 34/10; 209/138; 209/140; 209/141; 209/139.1; 422/145; 422/147; 422/219
[58] Field of Search ............... 422/145, 147, 219, 140; 23/313 FB; 34/10; 209/138, 139 R, 140, 141

[56] References Cited

U.S. PATENT DOCUMENTS

| | | | |
|---|---|---|---|
| 2,635,684 | 4/1953 | Joscelyne | 23/313 FB |
| 2,941,947 | 6/1960 | Schaver | 34/10 X |
| 3,152,005 | 10/1964 | Tuttle | 23/313 FB X |
| 3,738,821 | 6/1973 | Barber | 23/313 FB X |
| 3,842,888 | 10/1974 | Gibbons | 23/313 FB |
| 3,849,233 | 11/1974 | Lykou et al. | 23/313 FB X |
| 3,856,441 | 12/1974 | Suzukawa et al. | 209/139 R X |
| 3,918,921 | 11/1975 | Pierle | 23/313 FB X |
| 3,935,825 | 3/1976 | Matthews | 110/165 R |
| 3,969,546 | 7/1976 | Saeman | 23/313 FB X |
| 4,023,280 | 5/1977 | Schora et al. | 422/145 X |
| 4,132,634 | 1/1979 | Rumpt et al. | 209/138 X |
| 4,277,288 | 7/1981 | Lawrence et al. | 23/313 FB X |
| 4,330,502 | 5/1982 | Engström | 422/142 |
| 4,343,622 | 8/1982 | Bruynseels | 23/313 FB |
| 4,353,709 | 10/1982 | Nioh et al. | 23/313 FB |
| 4,353,732 | 10/1983 | Kinno et al. | 23/313 FB X |
| 4,369,045 | 1/1983 | Vorres | 34/10 X |
| 4,389,317 | 6/1983 | Trentelman et al. | 23/313 FB X |

FOREIGN PATENT DOCUMENTS

| | | | |
|---|---|---|---|
| 590557 | 1/1960 | Canada | 23/313 FB |
| 1483696 | 4/1967 | France . | |
| 2078592 | 5/1971 | France . | |
| 2418669 | 9/1979 | France . | |
| 1109410 | 4/1968 | United Kingdom | 23/313 FB |

Primary Examiner—Robert J. Warden
Assistant Examiner—Timothy M. McMahon
Attorney, Agent, or Firm—Sprung Horn Kramer & Woods

[57] ABSTRACT

Particulate material is discharged continuously from fluidized bed reactors by passing the material emerging at the lowest point of the fluidized bed through a zone which is narrower than the fluidized bed and in which a gas stream flows counter-current to the material, the pressure of the gas stream being above the pressure of the fluidized zone.

12 Claims, 1 Drawing Sheet

PROCESS FOR THE SIMULTANEOUS CLASSIFICATION AND REGULATED, CONTINUOUS DISCHARGE OF PARTICULATE MATERIAL FROM FLUIDIZED BED REACTORS

The invention relates to a process for the simultaneous classification and regulated, continuous discharge of particulate material from fluidized bed reactors, and apparatuses for carrying out the process.

Processes (LSG processes, "Liquid-solid-gas contacting") and apparatuses (for example Vometec®) for agglomeration, granulation, drying and classification are known, in which a liquid is sprayed into a bed which is in the fluidized state. To discharge the granules, a conical valve at the lowest point of the inclined fritted plate is opened periodically. Using such apparatuses, only discontinuous operation is possible for many substances. When the valve is opened, the fluidized bed is subjected to considerable disturbance. In addition, the classification effect is small. In some cases granular particles which are still too small are discharged, and on the other hand the residence time of some particles is so long that the particles become too large and can no longer be discharged, unless a complicated comminuting apparatus, which interferes with the fluidized bed, is provided, or apparatuses for classifying and comminuting the coarse fractions and recycling the fine fractions, which apparatuses are more expensive and make it more difficult to produce inert conditions, are installed outside the actual fluidized bed. Shutdown times are otherwise unavoidable.

The prior art is described, for example, in Chemie Anlagen und Verfahren 8 (1971), 49/51, or Chem. Ing. Techn. 48, 3 (1976), 199/205.

It is an object of the invention to improve the discharge from fluidized bed apparatuses, in particular to make continuous discharge possible, more uniform product quality being a critical requirement, in addition to economic advantages. The susceptibility of the discharge apparatus to defects is to be reduced; it is intended to make possible better and in addition regulatable classification.

A process for the simultaneous classification and regulated, continuous discharge of particulate material from fluidized bed reactors has now been found, which is characterised in that the material emerging at the lowest point of the fluidized bed is passed through a zone which is narrower than the fluidized bed and in which a gas stream flows counter-current to the material, the pressure of the gas stream being above the pressure in the fluidized zone.

BRIEF DESCRIPTION OF DRAWING

The accompanying drawing is a flow diagram depicting an apparatus of the invention.

DESCRIPTION OF SPECIFIC EMBODIMENTS

Figure 1:
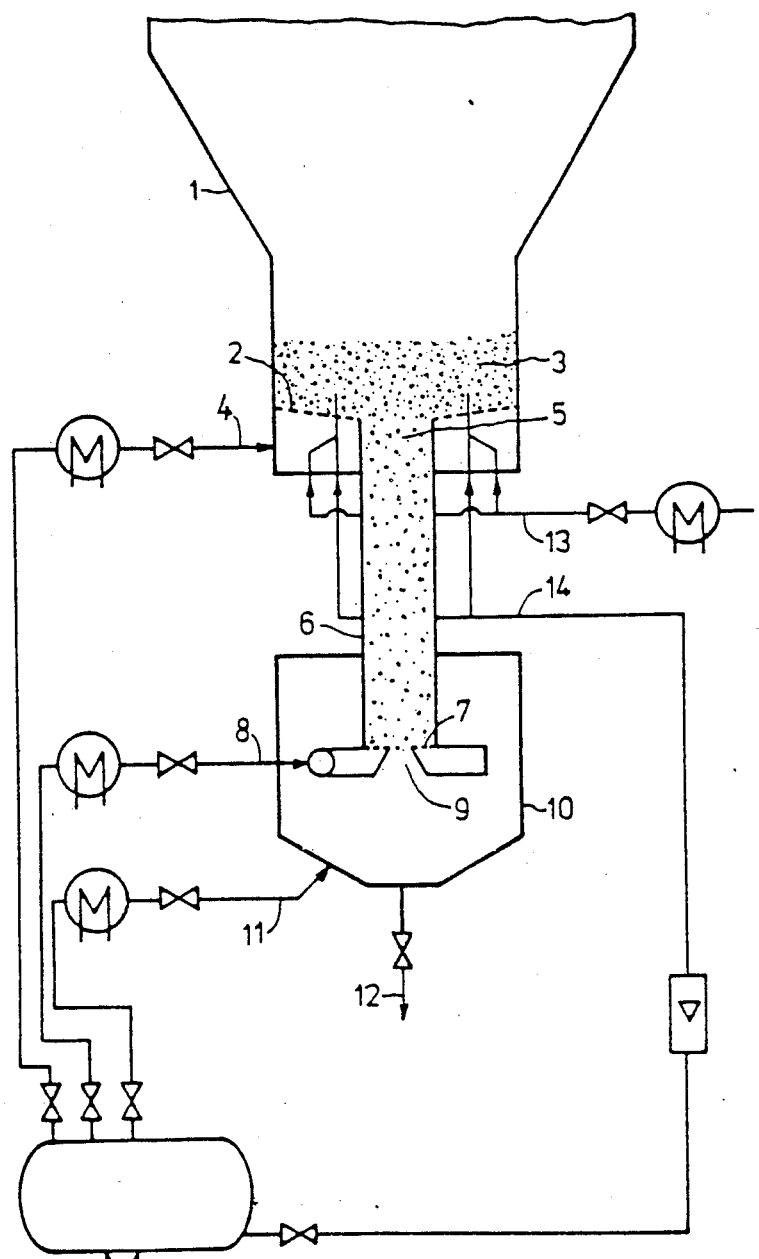

The invention furthermore relates to an apparatus for carrying out the process according to the invention, comprising a fluidized bed apparatus which is in itself known (1), provided with an outlet (5), a perforated plate (2) and a fluidizing-gas feed line (4), which is characterized by a discharge tube (6) which extends the outlet (5) downwardly and forms a narrowed zone, and by a blowing plate (7), an outlet (9) and a classification gas feed line (8).

The advantages of the process according to the invention lie in the improvement in product quality. Granules of constant size are obtainable. By suitable adjustment of the amounts of gas, the temperature, the flow velocities, the relative humidity and the height of the fluidized bed, a desired mean size of granules can be selected in a simple manner, depending on the product. Using the process according to the invention, trouble-free continuous operation can be realized, and, preferably, the coarse fractions of the granular material present in the fluidized bed are removed, the fine particles substantially remain in the fluidized bed, and the dust particles remain entirely in the fluidized bed. The classification gas can be used for subsequent drying, thereby facilitating in particular the granulation of strongly hygroscopic materials.

The process according to the invention, together with the apparatus, is represented in the drawing by way of example, and explained below.

The low-pressure fluidizing gas for the fluidized bed (3) enters at the bottom of a fluidized bed dryer (1) through a perforated screen plate (2), via (4). Ther perforated screen plate (2) is a perforated plate which slopes towards the middle and has an outlet (5). Below this outlet (5) is a discharge tube (6) which does not necessarily have to be cylindrical. At the bottom of this discharge tube (6), a perforated plate (7) is in turn present, through which, via (8), a gas flows from fine openings to maintain a classification process above (7). In order to distinguish it more easily, this plate (7) is designated as a blowing plate (7). The blowing plate (7) is level in this case and contains an opening (9), the diameter of which can be varied if required.

In the example, whereas the diameter of the fluidised bed is 400 mm, the discharge tube (6) above the blowing plate (7) has a diameter of 80 mm; the outlet (9) is conical, and the diameter is 20 mm at the top of the blowing plate and 40 mm at the bottom. The blowing plate (7) is enclosed in a housing (10) into which a gas can be fed via (11). In the operating state, the pressure in (10) is higher than that in (6), and in turn is higher there than in (3). The discharged material collects at the bottom of the housing (10) and is removed as required, via (12), without disturbing the fluidised bed. However, the discharge apparatus according to the invention also functions without the housing (10), and in this case the discharged material trickles continuously through the opening (9) into closed collecting vessels. The classification process above (7) is not disturbed by the opening (9). The housing (10) is an advantageous further development, since the classification effect can be further improved by its presence.

The high-pressure atomizing gas for the atomizer is fed in via line (13), and the solution to be atomized is fed in via line (14). For the sake of clarity, only two atomizers are shown in the Figure; the atomizers, in the form of two-material nozzles are arranged so that the atomized solution flows directly into the fluidizing bed.

For a particular product, the particle distribution in the fluidized bed is determined by selecting the pressure, the temperature, the nozzle arrangement, the bed height and the amount of the gas streams sprayed in. The perforated screen plate (2) slopes towards the middle; particularly the larger, heavier particles move to the middle and fall through the discharge tube (6). The gas entering at (8) and, if desired, at (11), classifies the granulated material. The velocity of these gas streams is greater than that of the gas flowing from the perforated screen plate (2). In this manner, a gas flow counter-current to the discharge direction is established in the discharge tube (6). Using this apparatus, continuous discharge from the drier is possible. The fluidized bed does not suffer any disturbance. Additional classification is also achieved. The classification effect can be further increased and regulated if a gas also flows through the opening (9), counter-current to the discharge direction. In addition, the rate at which discharge is to occur is regulated by the rate at which the gas flows through the opening (9). By means of suitable known measures during the discharge of the granules via (12), the fluidized bed is disturbed neither by (2) nor by (7).

Using the process according to the invention, one can granulate organic intermediate products, pharmaceuticals, tanning agents, dyestuffs, plant protection agents, detergents or foodstuffs from aqueous or non-aqueous solvents, with or without the addition of binders, in an advantageous manner, and to discharge the granules continuously from the fluidized bed reactor. The process according to the invention has proved particularly advantageous for the granulation of salts of inorganic or organic acids and aromatic hydroxy compounds, and of acetylsalicylic acid and N-acetyl-p-aminophenol. Preferably, sodium phenolate, potassium phenolate, potassium $\beta$-naphtholate, sodium $\alpha$-naphtholate, sodium $\beta$-naphtholate, sodium o-cresolate, sodium benzosulphonate, sodium m-nitrobenzosulphonate, sodium salicylate, sodium cyclamate, the potassium salt of 2-hydroxycarbazole, N-acetyl-p-aminophenol or acetylsalicylic acid is granulated with the aid of the process according to the invention.

Depending on the choice of the amount of gas, the temperature, the flow velocity and the height of the fluidized bed, one can, using the process according to the invention, obtain granules which possess a diameter in the range from about 0.05 to 5 mm, preferably from 0.1 to 2 mm. The internal surface area of the granules produced in this manner is in general in the range from 1 to 6 $m^2/g$, preferably 1.5 to 4 $m^2/g$ (determined according to the BET method, DIN 66,132).

For example, the process according to the invention can be carried out as follows (described for the example of the granulation of sodium phenolate):

In 560 kg/hour of fluidizing nitrogen (4) at 200° C., a 67% strength aqueous sodium phenolate solution at 110° C. was sprayed continuously into the fluidized bed drier (1). The amount of solution sprayed in was regulated so that a bed temperature of approx. 115° C. was established in the fluidized bed drier (1), a fluidized bed of granulated sodium phenolate being formed. The dust fraction present in the fluidizing gas removed was separated out and recycled to the fluidized bed drier (1). The coarse fraction of the granulated material was removed continuously from the fluidized bed, countercurrent to the classification-gas streams emerging from the feed lines (8) and (11) (15 kg/hour each). 25 kg/hour of granulated sodium phenolate were removed continuously via the opening (9) and discharged periodically via (12). The granules had the following particle distribution: main fraction (90%) 0.8 to 2 mm; internal surface area 2.5 $m^2/g$.

In the drawing, the necessary heat exchangers, pumps, display devices and regulating devices are not shown completely.

What is claimed is:

1. A process for granulating and classifying a product which consists essentially of:
    (a) spraying a material consisting essentially of a liquid to be converted into solid granules into a first fluidized bed to which a gas is admitted from below;
    (b) solidifying at least one component of said liquid in said first fluidized bed and therein forming aggregates of the resultant solidified component;
    (c) maintaining a second fluidized bed in a central narrow zone subsequent and below said first fluidized bed, said second fluidized bed and said first fluidized bed communicating with one another;
    (d) said second fluidized bed terminating at its bottom in a perforated screen;
    (e) removing solidified and aggregated granules from said first fluidized bed into said second fluidized bed and fluidizing said granules therein by directing a gas upon said granules from below;
    (f) the gas stream of step (e) being passed through said perforated screen countercurrently to the flow of said granules;
    (g) maintaining a pressure gradient between said first and said second fluidized bed such that the highest prevailing pressure is at the bottom of said second fluidized bed while allowing solids to flow from said first fluidized bed to said second fluidized bed; and
    (h) continuously discharging granules through said perforated screen along a path which is the longitudinal axis of said central narrow zone and is in a direction which is opposite to the direction of said gas of step (e), whereby the solidified and agregated granules are classified in said second fluidized bed and are recovered downstream of said perforated screen, wherein said first fluidized bed and said second fluidized bed have individual gas supply means.

2. A process according to claim 1, wherein the gas flow, temperature and height of said first fluidized bed are controlled to obtain a granulated product having a grain size diameter in the range of 0.05 to 5 mm and an intrinsic surface area in the range of 1 to 6 $m^2/g$.

3. A process according to claim 1, wherein the gas flow, temperature and height of the first fluidized bed are controlled to obtain a granulated product having a grain size diameter in the range of 0.1 to 2 mm and an intrinsic surface area of 1.5 to 4 $m^2/g$.

4. A process according to claim 1, wherein the granular size of the discharged granules is adjusted by controlling the cross-sectional flow through area of the perforated screen.

5. A process according to claim 1, wherein said material is an organic chemical in liquid form and said organic chemical is fed into said first fluidized bed.

6. A process according to claim 1, wherein the material introduced into said first fluidized bed comprises a pharmaceutical.

7. A process according to claim 1, wherein the material introduced into said first fluidized bed comprises a tanning agent.

8. A process according to claim 1, wherein the material fed into said first fluidized bed comprises a dyestuff.

9. A process according to claim 1, wherein the material fed into said first fluidized bed comprises a plant protection agent.

10. A process according to claim 1, wherein the material introduced into said first fluidized bed comprises a detergent.

11. A process according to claim 1, wherein the material introduced into said first fluidized bed comprises a foodstuff.

12. A process according to claim 1, wherein the material introduced into said first fluidized bed comprises sodium phenolate in the form of an aqueous solution thereof.

* * * * *

UNITED STATES PATENT AND TRADEMARK OFFICE
CERTIFICATE OF CORRECTION

PATENT NO. : 4,946,653

DATED : August 7, 1990

INVENTOR(S) : Stopp et al.

It is certified that error appears in the above-identified patent and that said Letters Patent is hereby corrected as shown below:

<u>TITLE PAGE</u>

Item [56]  U.S. PATENT DOCUMENTS:  Delete " 4,353,732, 10/1983 " and substitute -- 4,353,730, 10/1982 --

Signed and Sealed this

Sixteenth Day of June, 1992

Attest:

*Attesting Officer*

DOUGLAS B. COMER

*Acting Commissioner of Patents and Trademarks*